(12) United States Patent
Frich

(10) Patent No.: US 6,557,696 B1
(45) Date of Patent: May 6, 2003

(54) INCLINED CONVEYOR

(76) Inventor: Mark R. Frich, 12 Ferndale St., Maplewood, MN (US) 55119

( * ) Notice: Subject to any disclaimer, the term of this patent is extended or adjusted under 35 U.S.C. 154(b) by 0 days.

(21) Appl. No.: 09/594,268

(22) Filed: Jun. 15, 2000

(51) Int. Cl.[7] ............................................. B65G 15/14
(52) U.S. Cl. ................................ 198/626.6; 198/626.4
(58) Field of Search ......................... 198/626.4, 626.6, 198/626.1, 626.2, 626.3, 626.5, 835

(56) References Cited

U.S. PATENT DOCUMENTS

| | | | |
|---|---|---|---|
| 2,861,673 A | * 11/1958 | Sandganger | 198/626.4 |
| 3,412,840 A | * 11/1968 | Laikam | 198/626.6 X |
| 3,690,444 A | * 9/1972 | Chassang | 198/626.6 |
| 3,819,030 A | * 6/1974 | Warner | 198/626.4 |
| 4,425,995 A | 1/1984 | Blattermann et al. | |
| 4,457,422 A | * 7/1984 | Hurd | 198/626.6 X |
| 4,534,183 A | * 8/1985 | Hashimoto et al. | 198/626.6 |
| 4,535,884 A | 8/1985 | Suppan | |
| 4,562,918 A | 1/1986 | Tschematsch et al. | |
| 4,580,677 A | 4/1986 | Paelke | |
| 4,609,097 A | 9/1986 | Dos Santos | |
| 4,730,716 A | 3/1988 | Enneking et al. | |
| 4,844,236 A | 7/1989 | Kraus | |
| 4,872,542 A | 10/1989 | Enneking | |
| 4,879,034 A | * 11/1989 | Bastgen | 198/626.6 X |
| 4,951,806 A | 8/1990 | Schwing et al. | |
| 5,094,378 A | * 3/1992 | Aso et al. | 198/626.4 |
| 5,107,983 A | 4/1992 | Tschantz | |
| 5,547,065 A | * 8/1996 | Watanabe et al. | 198/604 |
| 5,641,056 A | 6/1997 | Lem | |
| 5,875,883 A | 3/1999 | Ertel et al. | |
| 6,003,659 A | 12/1999 | Uranaka et al. | |
| 6,264,022 B1 | * 7/2001 | Petack et al. | 198/626.4 |

* cited by examiner

*Primary Examiner*—D. Glenn Dayoan
*Assistant Examiner*—Patricia L. Engle
(74) *Attorney, Agent, or Firm*—Robert A. Paiak

(57) ABSTRACT

A conveyor apparatus transports materials along an incline. The apparatus includes an endless base conveyor belt that is tensioned between lower and upper end rollers and is aligned with the incline. A drive means drives the base belt at a selected speed and in a selected direction along the incline. An endless and freely hanging tension-less overhead conveyor belt is provided above the base belt, and has a substantially flat conveyance surface for conforming to and covering materials placed on the base belt. A drive roller of the tension-less overhead belt is coupled to the upper end roller of the base belt so as to drive the tension-less overhead belt at a speed and direction similar to that of the base belt.

11 Claims, 6 Drawing Sheets

INCLINED CONVEYOR

FIELD OF THE INVENTION

The present invention relates generally to a conveyor, and specifically to conveyance along an incline.

BACKGROUND OF THE INVENTION

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of librarians in handling these ever increasing volumes are often overwhelming.

A particularly problematic librarian task involves receiving material returned from patrons. This task, when manually performed by library personnel upon such ever-growing volumes of books and materials, greatly affects time required to repetitively collect and distribute each piece of material, i.e., "turn-around time" is negatively impacted. Moreover, manual performance of this task may lead to repetitive stress-type physical injuries.

In attempts to minimize these problems, procedures have been developed to provide some degree of automation in the receiving task. For example, some libraries have proposed utilization of a conventional single conveyor belt system for conveying materials returned from patrons at, for example, an extra-library return depository or an intra-library return desk or, to a materials check-in processing station.

In many libraries, the return depository or return desk is on one floor of a library building, while the check-in processing station is on another floor. Thus, it is desired that a conveyor system transport received library materials upward from one floor to another along an incline. Such an incline is often necessarily steep (greater than about 25 to 30 degrees) due to structural and architectural requirements of the library building.

It has been observed that in conventional single belt conveyors, materials being conveyed upward tend to slip or tumble down the belt when the incline is steep, due mainly to an insufficient coefficient of friction existing between the belt and the materials. It has also been observed that conveyance along a less-than-steep incline may not even be possible when the single belt surface in contact with the materials becomes contaminated or worn and loses some of its gripping ability. Making the belt "sticky", for example through use of adhesive-type surface coatings, is not desired in that such coatings may impart unwanted debris to the materials and may therefore be detrimental to the cleanliness of the materials.

In attempts to solve this steep incline conveyance problem, "cover belt" or "twin belt" conveyors have been proposed as alternatives to conventional single belt conveyors. Examples of these alternative conveyors are disclosed in U.S. Pat. No. 4,425,995 entitled "Cover Belt Conveyor" issued to Blattermann, et al., and in U.S. Pat. No. 6,003,659 entitled "Twin Belt Conveyor Apparatus" issued to Uranaka, et al. However, known conveyors of these types are best suited only for conveyance of bulk-type materials in that they commonly incorporate two driven flat belts each tensioned between head and tail pulleys, making for a relatively narrow conveyance space between the belts. These other conveyors may also utilize meshing, engaging, or mating protrusions of two cooperating belts for conveyance of the material there between. If used for conveyance of library-like materials, the driven and tensioned belts, and in some instances the cooperating protrusions, of these conveyors may damage the materials due to excessive forceful action of the tensioned belts and protrusions.

Further, it has been observed that bulk-type conveyors utilizing troughs, tubes, flights, or buckets, as disclosed for example in U.S. Pat. No. 4,535,884 entitled "Bulk-Handling Belt Conveyor" issued to Suppan and in U.S. Pat. No. 4,562,918 entitled "En-Mass Conveyor For Vertic[al] Or Steep Delivery Of Bulk Material" issued to Tschernatsch, et al., are unsuitable for library use due to varying sizes of the library-like materials and potential damage caused thereto.

Thus, there exists a need for a conveyor that performs the task of conveying library-like materials along a steep incline, without damaging the materials.

SUMMARY OF THE INVENTION

An object of the present invention is to provide an inclined conveyor that performs a function of transporting materials along a steep incline angle relative to ground.

Another object of the present invention is to provide an inclined conveyor that performs a function of transporting, along a steep incline, library-like materials from a receiving station to a check-in station.

A further object of the present invention is to provide an inclined conveyor that performs a function of transporting, along a steep incline, library-like materials from a receiving station, to a check-in station and to a storage container.

A yet further object of the present invention is to provide an inclined conveyor that does not damage library-like materials.

A still further object of the present invention is to provide an inclined conveyor that may be incorporated into an existing library building without a need for extensive remodeling of the building.

In accordance with the present invention, an inclined conveyor for conveyance of library-like materials from a receiving station to a check-in station includes an endless base belt conveyor. A base or materials support belt is tensioned around a drive roller assembly located closest to a ground plane, and around an upper roller at an opposing end. A tension-less freely hanging overhead endless belt is provided in juxtaposition with and above the base belt, and is driven by a slaved roller drive scheme in proximity to the upper roller of the base belt. A chain coupled to the upper roller of the base belt drives the slaved roller drive scheme. The overhead belt is structured so as to freely cover the base belt and materials placed thereon, and to provide relatively secure containment of materials upon the base belt, thereby allowing transport of the materials on the base belt along an incline, steep or otherwise, without tumbling or slipping.

DETAILED DESCRIPTION OF THE INVENTION

In the following exposition, the words "book", "material", and "library-like material" as used herein are synonymous, and are intended to include (i) any conventional library material such as, but not limited to, a bound book, a "paperback" book, a materials container (such as a magazine series receptacle or holder), a diskette cassette, a video tape, or (ii) any other tangible media that may have dimensions or an appearance similar or analogous to a conventional book.

Figure 1:
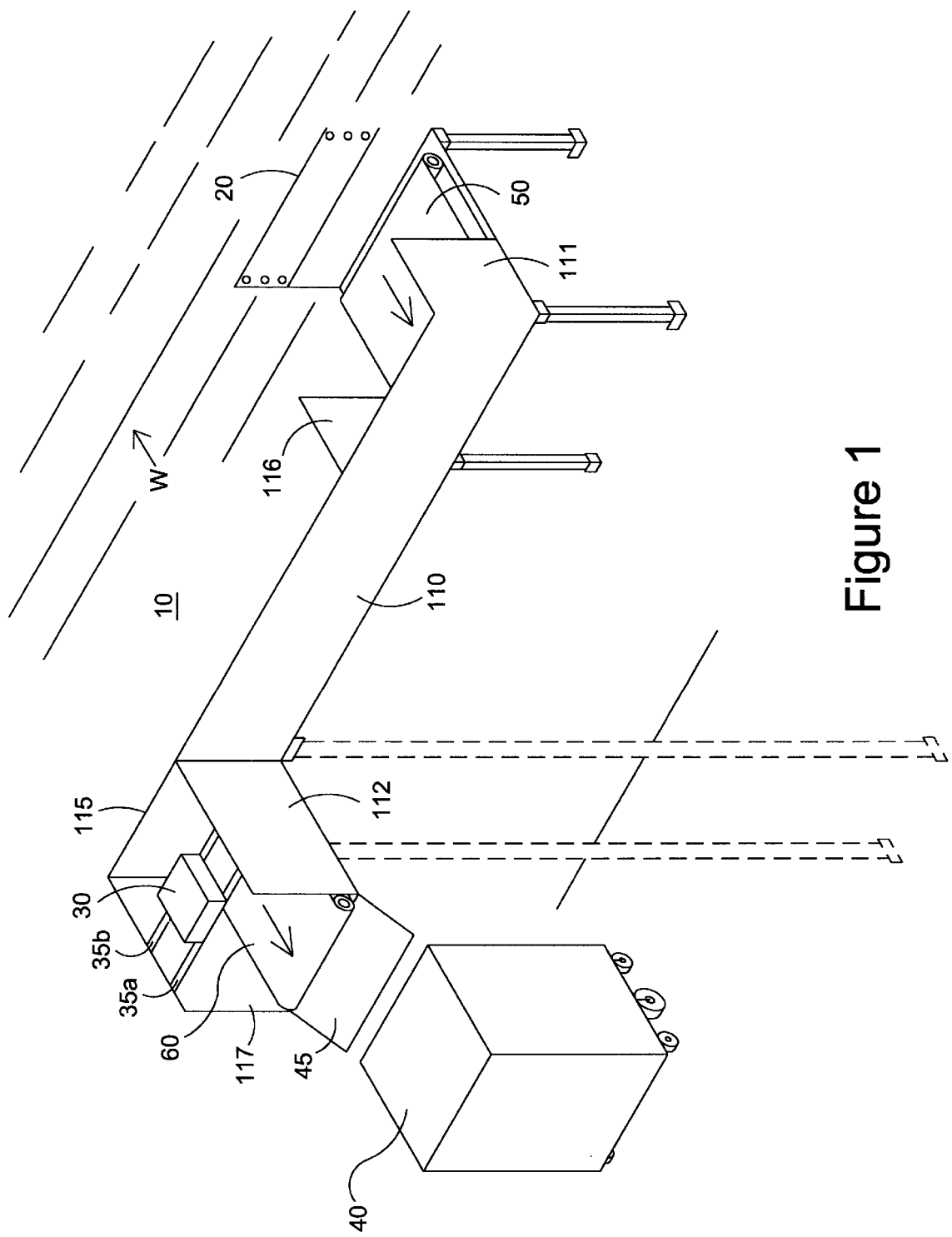
FIG. 1 is a perspective illustration of a material handling system for receipt of library-like materials, including an inclined conveyor of the present invention.

Referring to FIG. 1, thereshown is a perspective view illustration of an exemplary embodiment of an inclined conveyor 10 of the present invention, incorporated into an overall material handling system for receipt of library-like materials being returned by patrons to a library.

In this exemplary material handling system, inclined conveyor 10 provides, in part, movement of incoming library materials from a receiving station 20 located in an exterior wall of a library (generally identified by character "W") to a vicinity of an automated materials identification and check-in apparatus 30, and finally to a storage container or bin 40 byway of a slide chute 45. Bin 40 may be as disclosed in U.S. Pat. No. 6,000,770 entitled "A Library Book Bin With A Vertically Adjustable Floor" issued to Frich, and as provided by a SMART BIN™ library storage container available from Tech Logic Corporation of Oakdale, Minn.

Further in the exemplary embodiment, the material handling system may include a horizontal input belt conveyor 50 for transporting materials received at receiving station 20 to an input or lower end of inclined conveyor 10. Similarly, the system may also include a horizontal output belt conveyor 60 for transporting materials from an upward or output end of inclined conveyor 10.

For simplicity and clarity of the drawings, conveyors 50 and 60 are illustrated in FIG. 1 as motorized belt conveyors (drive motors not shown). However, any type of motorized conveyor may, of course, be employed.

Figure 2:
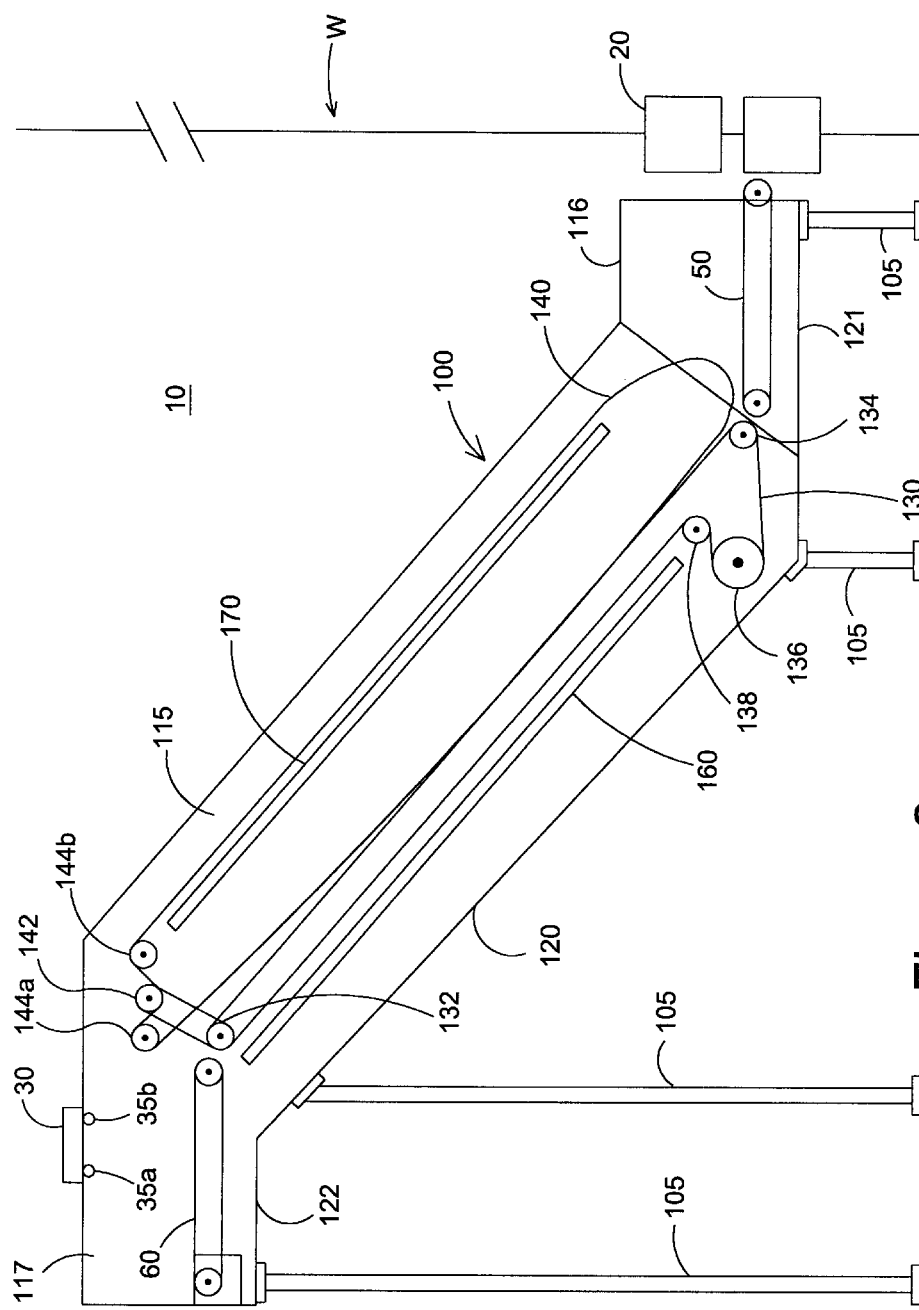
FIG. 2 is a partial transparent schematic side view of the inclined conveyor of the material handling system of FIG. 1, constructed in accordance with the present invention, and depicting a non-operative or at rest condition.

Illustrated in FIG. 2 is a transparent schematic side view of steep incline conveyor 10 illustrated in FIG. 1. Also depicted in the drawing is receiving station 20 embodying, for example, an automatic patron-activated library material depository designed for "hands-free" operation such as that described in co-pending U.S. patent application Ser. No. 09/507,614 filed on Feb. 21, 2000 and entitled "Access Device For A Materials Depository". Further depicted is automated materials identification and check-in apparatus 30 embodying, for example, a radio frequency identification (RFID) device such as that also described in the aforementioned co-pending application.

With reference to FIG. 1 and particularly to FIG. 2, steep incline conveyor 10 includes a conveyor frame 100 having left, right, and bottom side panel members 110, 115, and 120 respectively. As noted above, FIG. 2 is shown in transparent fashion such that left side panel member 110 of frame 100 is not illustrated, so that inner details of conveyor 10 may be readily ascertained. Frame 100 is provided for attachment and support of various components to conveyor 10 that will be described below.

Similarly, associated with conveyor 50 are panel members 111, 116, and 121, and with conveyor 60 are panel members 112, 117, and 122. As may be ascertained from the drawings, the aforementioned panel members of conveyors 50 and 60 may be joined together with the various panel members of frame 100 of conveyor 10 to form an overall complete housing for the material handling system.

In a particular installation of conveyor 10, frame 100 may be supported by way of support members 105. Support members 105, being structurally similar to conventional jack-type stands, function to support and positionally stabilize frame 100, particularly when conveyor 10 is in operation and may be experiencing various operational stresses. The aforementioned panel members of frame 100 are preferably fabricated from 14 ga. cold-rolled sheet steel and welded together.

Additionally in FIG. 1, materials identification and check-in apparatus 30 is shown as being supported above output conveyor 60 by way of brackets 35a–b fastened at their opposing ends to upper portions of panel members 110 and 115.

With particular reference again to FIG. 2, conveyor 10 includes a lower endless base belt 130 and a tension-less freely hanging endless overhead belt 140. Endless base belt 130 is tensioned between a head or upper roller 132 and a tail or lower roller 134 by way of a tensioning scheme, e.g., by roller positioning adjustment. Base belt 130 preferably has a durameter rating of 30 to 40, for providing non-slip gripping ability for materials placed thereon as will be further described. Conversely, overhead belt 140 is preferably selected to be relatively smooth. Length and width dimensions of each belt 130 and 140 are, of course, chosen with regard to needs of a particular installation. In a library, for example, belts 130 and 140 are commonly chosen to have widths of about 18 inches each, for adequate transport of a typical variety of material sizes. Lengths of each belt 130 and 140 are largely dependent, however, upon the selected length of conveyor 10.

A drive scheme for base belt 130 may be provided by way of a motorized drive drum 136 and a cooperating drive roller 138. Drive drum 136 may be driven by any suitable technique (not illustrated).

As may be appreciated with continued reference to FIG. 2, tension-less freely hanging endless overhead belt 140 is, unlike base belt 130, not tensioned between head and tail rollers. Rather, belt 140 is driven by way of a slaved drive roller 142 and cooperating tensioning rollers 144a–b acting collectively as a head roller. The particular absence of a tail roller scheme provides, as will be further described, an ability of belt 140 to conform to and partially encase or envelope materials on base belt 130. When conveyor 10 is not in operation, it is to be understood that a majority of belt 140 freely lies upon belt 130. When conveyor 10 is in operation, however, an amount of belt 140 lying on belt 130 is reduced due to spatial volumes of materials being transported and taking up slacks in belt 140 as will be further described.

Slaved drive roller 142 is motively coupled to upper roller 132 of base belt 130 through a drive chain 150. It is to be understood that motive force is imparted to drive chain 150 by rotational motion of upper roller 132 through operational movement of base belt 130, as will be more fully described. The motive coupling of upper roller 132 to drive roller 142 through drive chain 150 may be accomplished by any suitable means such as, for example, providing chain sprockets (not illustrated) on each roller 132 and 142 to accommodate drive chain 150. It is to be particularly appreciated that slaved drive roller 142 in cooperation with tensioning rollers 144a–b collectively provide a "traction motor" scheme for overhead belt 140.

Conveyor 10 preferably also includes a base belt support bed 160 and an overhead belt guide panel 170. Support bed 160 is welded along its lengthwise edges orthogonally to left and right side panel members 110 and 115 (as depicted in FIG. 2), respectively, to provide support to base belt 130 when materials are placed thereon in operation of conveyor 10. Overhead belt guide panel 170 is structurally similar to support bed 160, and is similarly welded orthogonally along its lengthwise edges to left and right side panel members 110 and 115 to provide a guide means to overhead belt 140 in operation of conveyor 10.

Figure 3:
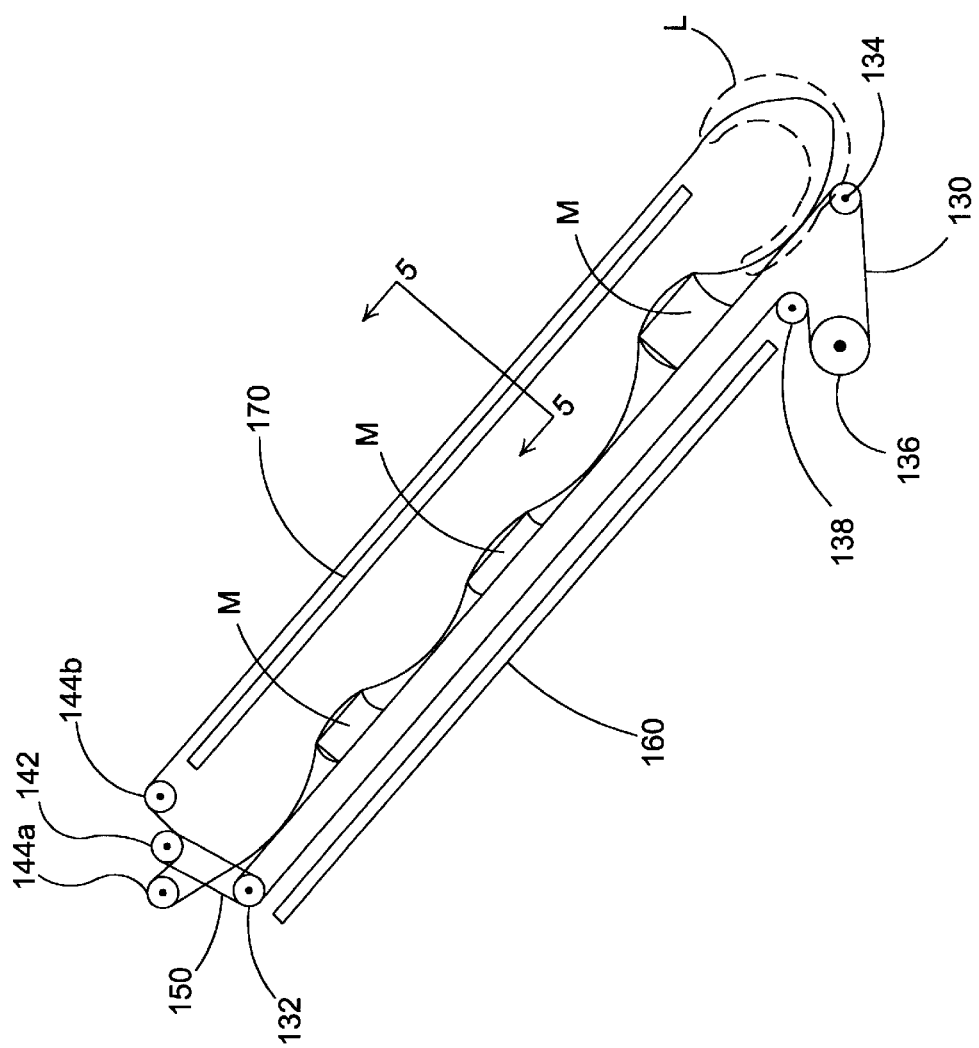
FIG. 3 is a partial illustration of the side view of FIG. 2, depicting an operative or in-use condition.

Turning, now, to FIG. 3, there shown is a partial illustration of the side view of the invention shown in FIG. 2, in operation of steep incline conveyor 10. In FIG. 3, receiving station 20, check-in apparatus 30, horizontal conveyors 50 and 60, and frame 100 have each been removed from the drawing for clarity thereof. Further, FIG. 3 depicts an exemplary conveyance of library-like material items (reference characters "M") upward along support bed 160 (from a vicinity of drive roller 138 to a vicinity of upper roller 132) that have been introduced to conveyor 10 by way of, for example, horizontal conveyor 50 (not illustrated, as aforestated).

As drive drum 136 and drive roller 138 operate to drive base belt 130, in a counter-clockwise sense viewed as a whole for upward conveyance of materials M, upper roller 132 responsively rotates in a counter-clockwise sense, thereby driving drive chain 150 and thus slaved drive roller 142 also counter-clockwise. In this manner, overhead belt 140 is caused to be responsively driven in a clockwise sense, viewed as a whole. It is to be appreciated in this exemplary operation of conveyor 10 that belts 130 and 140 move cooperatively to convey materials M upward. Specifically, the cooperation between belts 130 and 140 is achieved upon materials M due to, in part, an addition of an effective weight to each item of material M upon base belt 130 from a weight of overhead belt 140 acting downwardly upon material M toward base belt 130. Therefore, material M is prevented, to a significant degree, from slipping or tumbling downwardly along base belt 130. Also, the aforementioned durameter rating of 30 to 40 of base belt 130 provides sufficient gripping ability on materials M. Further, it may be appreciated that since belts 130 and 140 are driven at, or nearly at, the same speed through the aforedescribed slaved traction drive scheme, materials M being transported are acted upon by two cooperatively moving belt surfaces. That is, as may be appreciated by reference again to FIG. 3, overhead belt 140 acts to conform to and partially encase or envelope each item of material M being conveyed along base belt 130. Such enveloping provides further static stability to material M against slipping or tumbling down base belt 130.

Also, it is to be appreciated in the drawing that belt 140 forms a freely hanging tension-less loop (generally outlined by a dotted line and identified by reference character "L") near lower roller 134. In operation of conveyor 10, loop L is diminished or "taken up" as more materials M are added to base belt 130 and belt 140 conforms to and partially envelopes those added materials M.

Preferably in operation of the overall material handling system, operational speed ratios of horizontal input conveyor 50 to inclined conveyor 10 and to horizontal output conveyor 60 are factors of 1.5 and 2.5, respectively. For example, if input conveyor 50 is selected to run at a speed of 60 ft./min, then inclined conveyor 10 would be selected to run at about 1.5 times that speed, or at about 90 ft./min. In like manner, output conveyor 60 would be chosen to run at a speed of about 2.5 times the speed of input conveyor 50, or at about 150 ft./min. Such exemplary speed ratios have been found to efficiently operate the material handling system for prevention of "bottlenecks" at input conveyor 50, for optimized operation of conveyor 10, and for orderly outflow of materials M from output conveyor 60.

Figure 4:
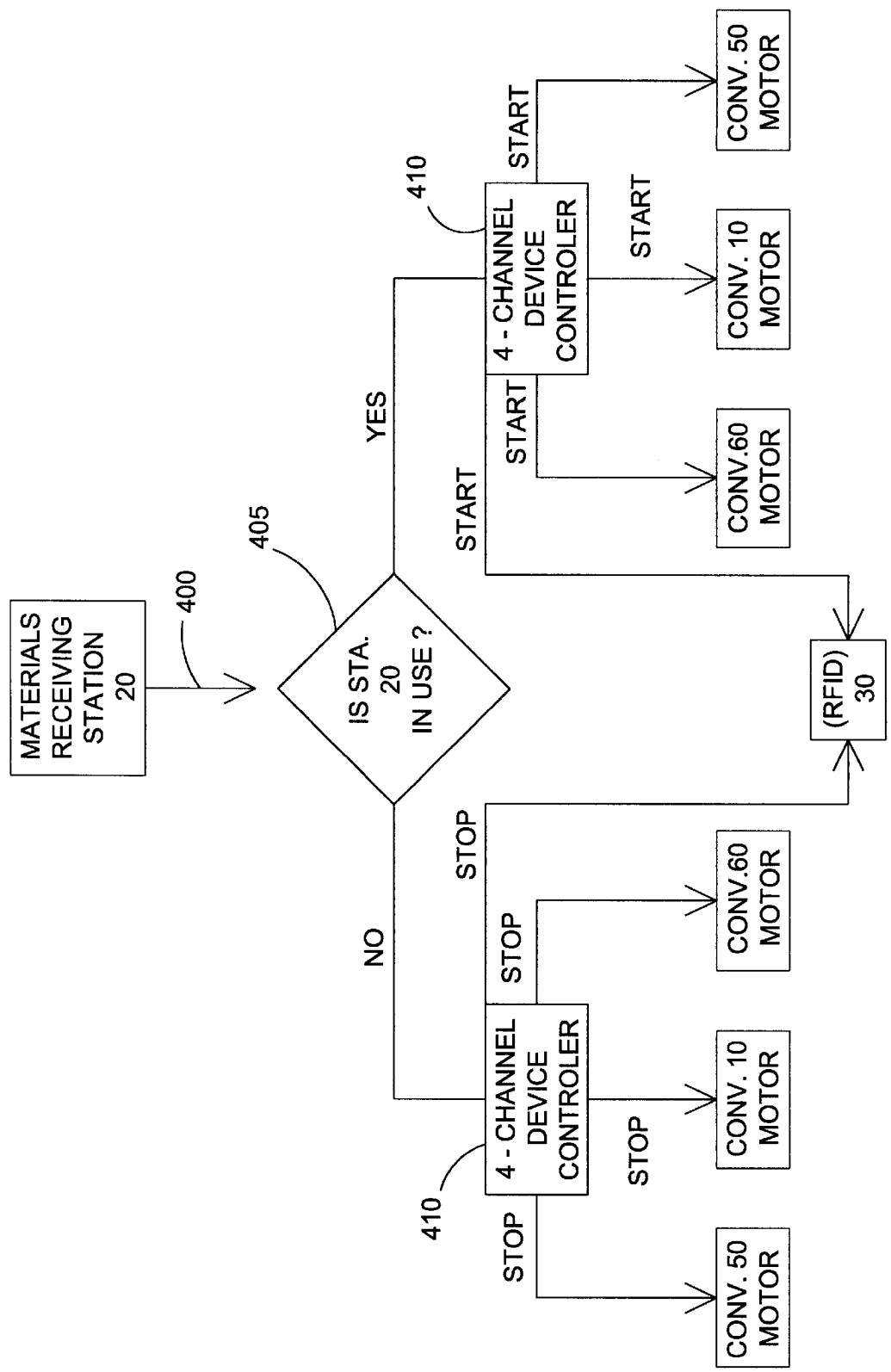
FIG. 4 is a schematic flow diagram illustrating a material handling system control scheme in accordance with the present invention.

FIG. 4 is a schematic flow diagram of an exemplary control scheme for operation of a materials handling system including steep incline conveyor 10. In the diagram, materials receiving station 20 (as described in the aforementioned co-pending application) responsively generates a system signal 400 indicative of an in-use or not-in-use condition of receiving station 20. Start-up signal 400 is then provided as an input to a logical decision gate 405. Gate 405 determines whether receiving station 20 is in use based upon signal 400.

If station 20 is in use, then gate 405 outputs a logical "YES" or "1" signal to a 4-channel device controller or relay 410. Responsively, device controller 410 allows transfer of sufficient electrical energy to electric motors associated with each conveyor 10, 50, and 60 for operation thereof. Concurrently with the energizing of each conveyor motor, device controller 410 also allows transfer of sufficient electrical energy to materials identification and check-in apparatus 30 (preferably, an RFID device) for operation thereof.

Conversely, if station 20 is not in use, then gate 405 outputs a logical "NO" or "0" signal to 4-channel device controller or relay 410. Responsively, device controller 410 stops transfer of electrical energy to the electric motors associated with each conveyor 10, 50 and 60; and concurrently, device controller 410 then also stops transferring electrical energy to apparatus 30.

It should be understood that the aforedescribed control scheme may be controlled by a computerized control system such as a computer workstation or the like. Although the operation and control of the conveyor 10 and overall materials handling system of the present invention has been described herein in simple control terms and concepts, it should be appreciated that alternative or more complex controls and systems are all within the true spirit and scope of the present invention as claimed herein.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results. For example, those of ordinary skill in the art will appreciate that the present invention may be selectively adapted for conveyance of materials either up or down an incline (i.e., as an incline or decline conveyor 10 with a corresponding positional change of various elements of the invention, as may be necessary).

Figure 5:
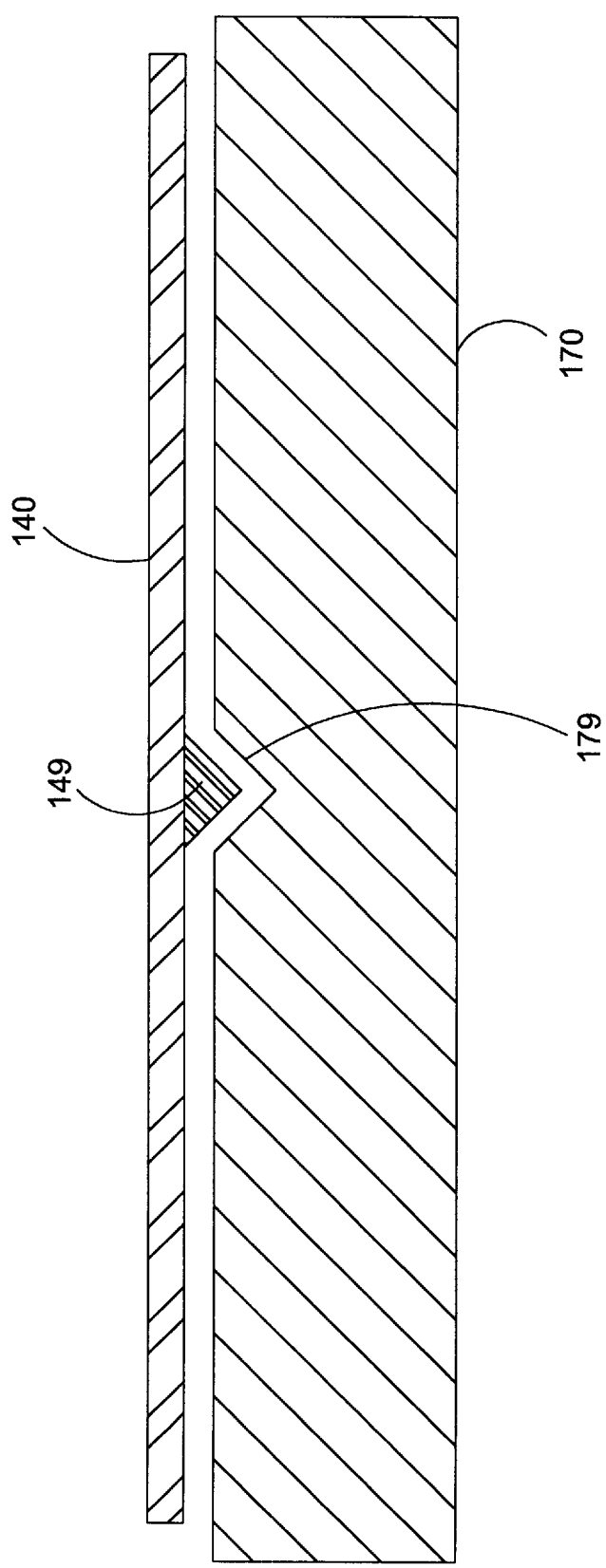
FIG. 5 is a magnified cross-sectional illustration of an alternative component of the conveyor depicted in FIG. 3.

Also, as depicted in magnified cross-section in FIG. 5, overhead belt guide panel 170 together with overhead belt 140 may include a v-guide arrangement for providing longitudinal centering of overhead belt 140 between panels 110 and 115 in operation of conveyor 10. Specifically, overhead belt 140 could include a longitudinal "v-strip" 149 fixed and centered along belt 140, that would mate with a longitudinally centered "v-channel" 179 in panel 170. In this arrangement, v-strip 149 runs along and within v-channel 179 in operation of belt 140, thereby providing such longitudinal centering of belt 140.

Further, support members 105 could be hung from a ceiling installation as an alternative to their jack-stand type of function.

Figure 6:
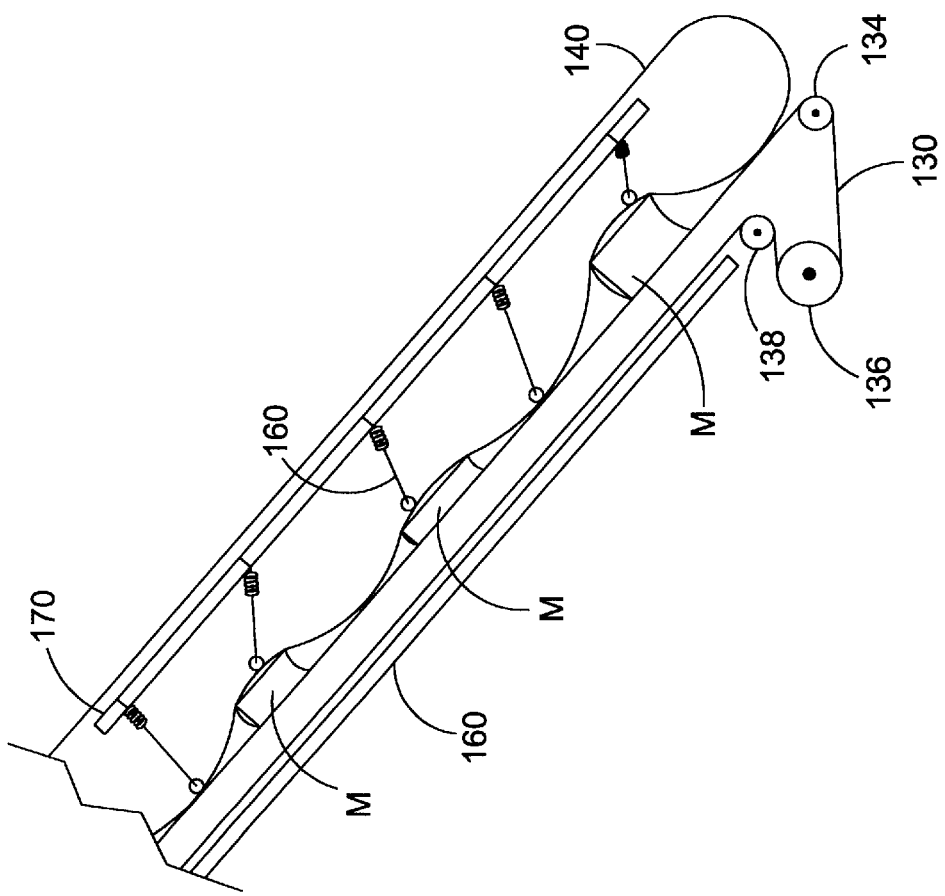
FIG. 6 is a partial illustration of FIG. 3, depicting a further embodiment of the present invention.

Also, illustrated in FIG. 6 is an alternative embodiment of conveyor 10 that is particularly useful when a steep incline of conveyor 10 exceeds about 70 degrees. In the drawing, spring loaded bogey wheel arms 600 are coupled to overhead belt guide panel 170 for providing additional pressure to belt 140 as it conforms to and partially encases or envelopes each item of material M being conveyed along base belt 130. Such additional pressure on belt 140 imparted thereto by arms 600 provides enhanced stability to material M against slipping or tumbling.

Figure 7:
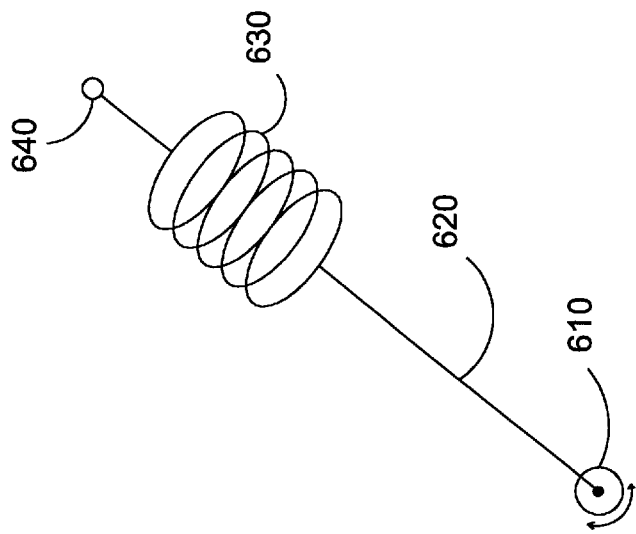
FIG. 7 is a magnified illustration of a component of the present invention depicted in FIG. 6.

With reference to FIG. 7, an arm 600 is shown in magnified fashion for clarity. Therein, arm 600 includes a bogey wheel 610, a wheel arm 620 coupled to wheel 610, and a spring 630 coupled to arm 620 having an attachment loop 640 for the aforesaid coupling of arm 600 to overhead belt guide panel 170.

It is to be appreciated that arms 600 particularly provide enhanced conformity of belt 140 to materials M when a large volume of materials M are being introduced to conveyor 10. That is, large volumes of materials M tend, in operation of conveyor 10, to run "together" or form effectively large material M spaces between belts 130 and 140; thus, the aforedescribed enveloping of belt 140 may be diminished due to a consequent lack of slack in belt 140 and diminished ability of belt 140 to lie on belt 130. Arms 600 alleviate this problem by introducing an additional force to belt 140 and, in turn, to materials M on belt 130 so that materials M may be held in place thereon.

Additionally, each motor for operation of each conveyor 10, 50, and 60, may be chosen to develop a desired amount of revolutions per minute, for providing the aforementioned operational speed ratios. These RPM choices may be achieved by selection of various horsepower motors, or possibly by a rheostat-like control of identical motors.

Further, it will be appreciated by those skilled in the art that any suitable conveyance or transport technique may be substituted for base belt 130. Such techniques may include rolling or sliding beds or shuttles, a fixed roller bed, or even simply a low-friction surface for sliding movement of materials M thereupon.

Lastly, the choice, of course, of mechanical sizes and strengths of various components are all a matter of design choice depending upon intended use and objects intended to be handled by the system of the present invention.

Accordingly, these and other various changes or modifications in form and detail of the present invention may also be made therein, again without departing from the true spirit and scope of the invention as defined by the appended claims.

What is claimed is:

1. An inclined sandwich conveyor system for transporting library articles and materials from a lower receiving end to an upper delivery end comprising:
   a lower endless belt conveyor assembly for transporting materials from a lower receiving end thereof to an upper delivery end thereof including,
      an endless transport belt extending upward from said lower receiving end to said upper delivery end, said endless transport belt including an upward facing side for transporting materials placed thereon from said lower receiving end to said delivery end, and
      a lower conveyor assembly drive mechanism for driving said endless transport belt so as to cause said upward facing side to move in a first direction at a first selected speed; and
   an upper endless belt conveyor assembly,
      said upper endless belt conveyor assembly including an endless material holding belt extending from an upper conveyor assembly drive mechanism in proximity to said delivery end, freely and tension-less toward said lower receiving end, and
      said endless material holding belt having a downward facing side facing, and having a selected peripheral length sufficiently long so as to be capable of freely resting, in part, on said upward facing side of said endless transport belt and any materials lying on said upward facing side of said endless transport belt, and
      where said upper endless belt conveyor assembly drive mechanism is directly coupled to said holding belt for driving said downward facing side of said endless material holding belt to move in said first direction at a second selected speed, and said drive mechanism is a tractor drive mechanism including a pair of tension rollers on opposite sides of a central drive roller, where said material holding belt is serpentinely threaded through said combination of the central drive roller and said tension rollers.

2. The apparatus of claim 1 wherein:
   said lower endless belt conveyor assembly includes a drive roller for causing movement of said first endless transport belt in said first direction, and
   said drive roller of said upper endless belt conveyor assembly is motively coupled to said drive roller of said lower endless belt conveyor assembly for causing movement of said endless material holding belt in said first direction.

3. The incline sandwich conveyor system of claim 2 wherein said lower conveyor assembly drive mechanism includes a motorized drive drum coupled to said drive roller of said lower endless belt conveyor assembly.

4. The incline sandwich conveyor system of claim 1 wherein said upper endless belt conveyor assembly includes a belt guide for supporting said endless material holding belt, said belt guide generally extending substantially between first and second ends thereof, where said first end is in proximity to said delivery end of said lower endless belt conveyor assembly, and where said endless material holding belt freely hangs from said belt guide.

5. The incline sandwich conveyor system of claim 1 wherein said upper endless conveyor belt assembly includes
   a belt guide for supporting an upward facing side of said endless material holding belt, said belt guide generally extending substantially between first and second ends thereof, where said first end is in proximity to said delivery end of said lower endless belt conveyor assembly;
   a drive roller for causing movement of said endless material holding belt in said first direction, wherein said downward facing side of said endless material holding belt freely hangs from said upper conveyor assembly drive mechanism at one end, and from said second end of said belt guide.

6. The incline sandwich conveyor system of claim 5 wherein said selected peripheral length of said endless material holding belt is sufficient to form an outward loop extending beyond and away from said second end of said belt guide.

7. The incline sandwich conveyor system of claim 1 further comprising:

belt support means extending along a at least a portion of a path between said receiving end and said delivery end, and having an upward facing member for supporting an upper portion of said endless material holding belt; and a plurality of resilient pressure exerting fingers extending from a downward facing member of said belt support belt means toward an inside surface of said endless material holding belt facing downward toward said upward facing endless transport belt so as to enhance conformity of said endless material holding belt upon any materials on said endless transport belt and avoiding slippage thereon.

8. The incline sandwich conveyor system of claim 7 wherein said resilient pressure exerting fingers comprise:

an arm member having a pressure end member coupled to a first end of said arm member configured to apply pressure to said inside of said endless material holding belt, and a second end secured to said downward facing member of said belt support means; and said arm member including a spring like member between said first and second ends of said arm-like member.

9. The incline sandwich conveyor system of claim 8 wherein said pressure end member is a bogey wheel.

10. A method for transporting materials at an incline from a lower receiving end to an upper delivery end comprising the steps of:

placing materials on an endless transport belt of a lower endless belt conveyor assembly where said endless transport belt extends upward from said lower receiving end to said upper delivery end, said endless transport belt including an upward facing side for transporting materials placed thereon from said lower receiving end to said delivery end; and covering said materials with a portion of an endless material holding belt of an upper endless belt conveyor assembly extending from an upper conveyor assembly drive mechanism, in proximity to said delivery end, freely and tension-less toward said lower receiving end, and where said endless material holding belt has a selected peripheral length sufficiently long so as to be capable of freely resting, in part, on said upward facing side of said endless transport belt and any materials lying on said upward facing side of said endless transport belt;

driving said endless transport belt by a lower conveyor assembly drive mechanism so as to cause said upward facing side of said endless transport belt to move in a first direction at a first selected speed; and driving said endless material holding belt by an upper conveyor assembly drive mechanism such that said downward facing side of said endless material holding belt moves in said first direction at a second selected speed, such that any materials lying on said upward facing side of said endless transport belt move in said first direction and held fast against said upward facing side of said endless transport belt as it moves in said first direction, where said upper endless belt conveyor assembly drive mechanism is directly coupled to said holding belt for driving said downward facing side of said endless materials holding belt to move in said first direction at a second selected speed, and said drive mechanism is a tractor drive mechanism including a pair of tension rollers on opposite sides of a central drive roller, where said holding belt is serpentinely threaded through said combination of the central drive roller and said tension rollers.

11. The method of claim 10 further comprising the step of:

supporting said endless material holding belt along at least a portion of a path between said receiving end and said delivery end, and having an upward facing member for supporting an upper portion of said endless material holding belt; and applying resilient pressure toward an inside surface of said endless material holding belt facing downward toward said upward facing endless transport belt so as to enhance conformity of said endless material holding belt upon any materials on said endless transport belt and substantially avoiding slippage thereon.

* * * * *